United States Patent [19]

Ueno

[11] Patent Number: 5,966,862
[45] Date of Patent: Oct. 19, 1999

[54] BIRD CATCHING APPARATUS

[75] Inventor: Hajime Ueno, 8-25, Todaiji 3-chome, Shimamoto-cho, Mishima-gun, Osaka 618, Japan

[73] Assignee: Hajime Ueno, Osaka, Japan

[21] Appl. No.: 08/712,322

[22] Filed: Sep. 11, 1996

[30] Foreign Application Priority Data

Sep. 12, 1995 [JP] Japan .................................. H7-233694

[51] Int. Cl.⁶ .......................... A01M 23/02; A01M 23/32
[52] U.S. Cl. ........................................ 43/63; 43/58; 43/60
[58] Field of Search .................................. 43/58, 60, 62, 43/134, 135, 8, 63; 124/36, 16, 7

[56] References Cited

U.S. PATENT DOCUMENTS

| | | | |
|---|---|---|---|
| 49,723 | 9/1865 | Rex | 43/62 |
| 1,413,155 | 4/1922 | Beckett | 43/135 |
| 2,839,867 | 6/1958 | Knutsen | 43/62 |

FOREIGN PATENT DOCUMENTS 1007949  10/1965  United Kingdom ........................ 43/60

*Primary Examiner*—Kurt Rowan
*Attorney, Agent, or Firm*—Seed and Berry LLP

[57] ABSTRACT

The present invention provides a bird catching apparatus for deploying a catching net rapidly and surely, thereby catching birds surely. Each end of one side edge of the catching net is respectively connected to a pair of deploying arms of each deploying device via a pole member. Each deploying arm is pulled by a pair of extension springs of a deploying unit, and are locked by a locking unit. At the same time, the deploying arms are pulled upward by an auxiliary arm of an auxiliary urging unit. When the deploying arms locked by the locking unit are released, the deploying arms are surely rotated upward, thereby rotating along a vertical surface for over 180°. The catching net is thus deployed.

4 Claims, 5 Drawing Sheets

BIRD CATCHING APPARATUS

TECHNICAL FIELD

The present invention relates to an apparatus for catching birds such as ducks and pheasants, and particularly an apparatus which makes it possible to catch birds without hurting them.

BACKGROUND OF THE INVENTION

Birds such as ducks and pheasants are usually caught by guns or nets. Bird hunting grounds for birds such as ducks can include a lake, watercourses, a paddy field, damp ground, and ponds or the like. In a hunting ground area, people can also be engaged in fishing, agriculture, and leisure. Therefore, it is dangerous to catch birds by using guns, which may hurt people and do hurt birds, and are thereby not preferable. On the other hand, in the case of catching birds by using a net, there is no fear of hurting people who enter the hunting ground. The net has the advantage that it can set birds free without any harm.

A net can be woven of silk, cotton, twine, or nylon. Birds are entwined with the net and thereby caught. To catch birds, a catching net is provided on the surface of the earth, and birds such as ducks are collected by sprinkling food. After birds gather, the catching net is manually moved to cover the birds, thereby catching them. Moreover, a method of providing the catching net on a slope banked up to a height of about 40–50 cm has been recently developed.

In catching birds by using the above net, the catching net must be moved so as to cover the birds. Therefore, in case that the moving speed is slow, the birds can flee and there is the possibility that it cannot catch the birds. In particular, moving the net may be manually performed by pulling a rope arranged with the catching net, which causes a problem because moving the catching net at high speed requires skill. If the rope is pulled in the vicinity of the catching net, moving the catching net requires relatively weak power, but there is the possibility that the birds will keep away if they recognize the existence of operators in the area of the catching net. In order to gather the birds in the area of the catching net, the rope must be pulled from a relatively remote place, wherein moving the catching net requires strong power.

Moreover, the catching net is provided on the surface of the earth in a widely spread state, thereby causing a problem wherein the birds easily recognize the spread catching net and keep away from the vicinity of the catching net. When the catching net is moved to cover the birds so as to catch them, it confines the birds only due to its own weight, and there is the possibility that the birds can easily flee through a clearance between the catching net and the surface of the earth.

The present invention resolves the above problems, and has the object of providing a bird catching apparatus for enabling birds such as ducks to be surely caught. Another object of the present invention is to provide a bird catching apparatus wherein there is no possibility that the caught birds can flee.

SUMMARY OF THE INVENTION

In order to accomplish the above objectives, a bird catching apparatus according to the present invention comprises a catching net folded linearly, having one side edge and the other side edge, each end in the one side edge fixed in the surface of the earth, and a pair of deploying devices having respective deploying arms, with a tip of each deploying arm respectively connected with each end in the other side edge of the catching net, whereby the catching net is deployed by causing the tip of each deploying arm to rotate above the surface of the earth along a vertical surface.

Each deploying device includes a deploying unit for urging the deploying arm so as to make it rotate in a fixed direction, and an auxiliary urging unit for urging the tip of each deploying arm in the same direction as the direction urged by the deploying unit. The deploying unit includes a pulley, arranged at the base end of each deploying arm, for rotating integrally with the deploying arms, a wire rope wound around the pulley with one end fixed in the pulley, and a pair of extension springs for urging the wire rope. The deploying device includes a locking unit for locking the deploying arms in a state urged by the deploying unit, and a releasing unit for releasing the deploying arms locked by the locking unit.

The releasing unit is preferably a solenoid to be operated by remote control. The deploying device is preferably fixed in a storage box buried underground.

DETAILED DESCRIPTION OF THE INVENTION

Figure 1:
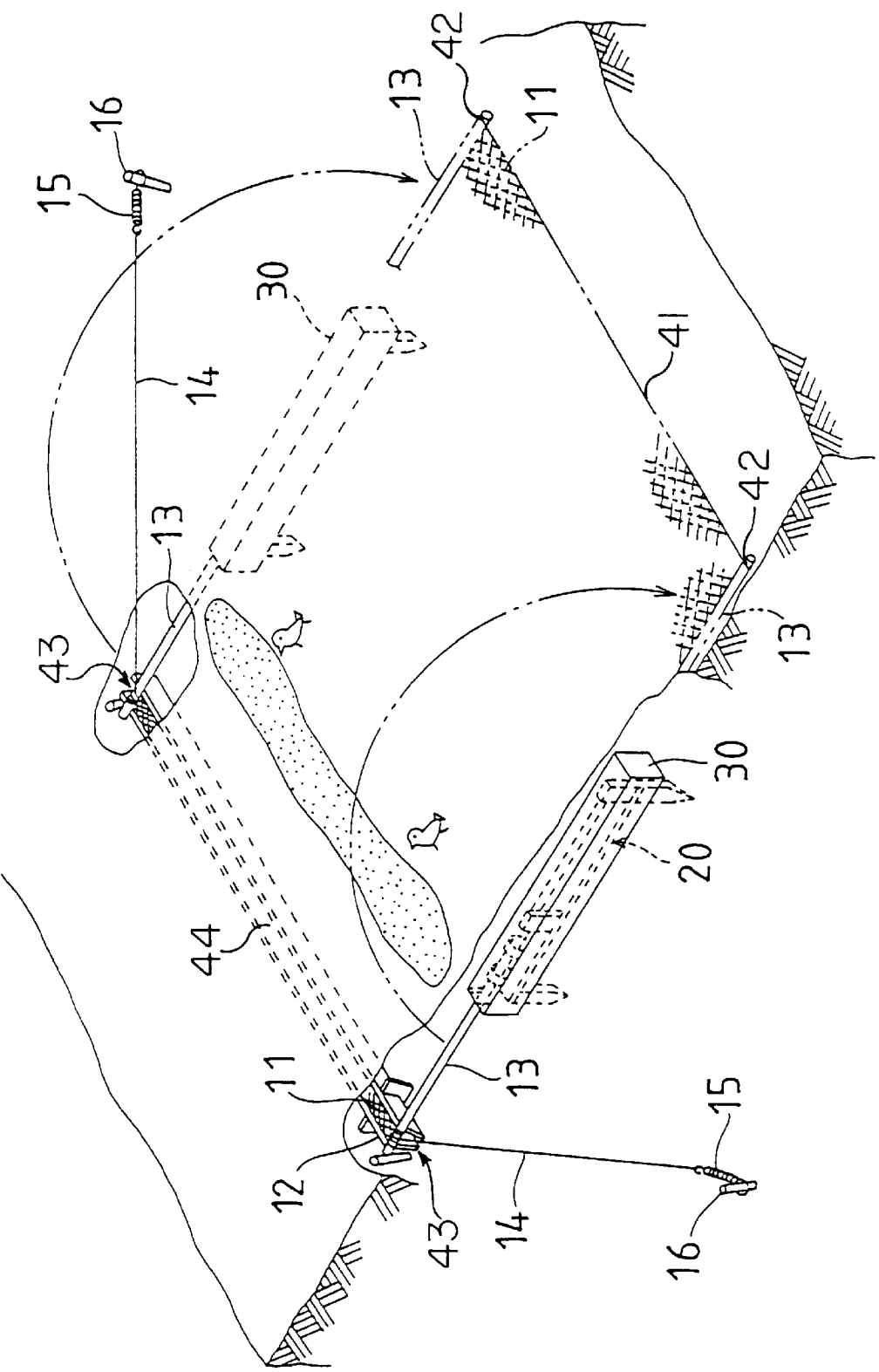
FIG. 1 is a schematic view illustrating a bird catching apparatus according to an example of the present invention.

Referring now to the drawings, an embodiment of the invention is described in detail below.

FIG. 1 is a perspective view illustrating a bird catching apparatus according to an example of the present invention. The bird catching apparatus comprises a catching net 11 held in a folded state inside a net cover 12 buried underground, and a pair of deploying devices 20 respectively arranged inside a pair of storage boxes 30 buried underground.

The catching net 11 has one side edge 44 and the other side edge 41 with each end 43 in the one side edge 44 fixed in brace piles or the like. The catching net 11 is folded linearly inside the net cover 12 with its linear groove held and covered with sand or the like, and together with the net cover 12 is buried shallowly underground. Each end 42 of the other side edge 41 is arranged at a tip of one of the pole members 13. Each pole member 13, comprised of bamboo, lumber or the like, falls at right angles with the net cover 12 and is buried shallowly underground, and each base end is connected to a deploying device 20 held inside each storage box 30. The deploying device 20 causes the connected pole member 13 to rotate vertically above the surface of the earth for more than 180°. When each pole member 13 rotates along a vertical surface, the end 42 of the catching net 11 arranged at the tip of each pole member 13 is moved from the net cover 12 to the far side of the deploying device 20, thus deploying the catching net 11 on the surface of the earth. The locations of the side edges 41 and 44 and of ends 42 and 43 are illustrated in FIG. 1 while the catching net is deployed on the surface of the earth.

The tip of each pole member 13 is fixed to one end of each wire rope 14. The other end of each wire rope 14 is fixed to the brace pile 16 through an extension spring 15. The catching net 11, when deployed on the surface of the earth, is pressed to the surface of the earth by the wire ropes 14 pulled by the extension springs 15. When the catching net 11 rotates at high speed, each extension spring 15 prevents rotation speed of the pole members 13 from being slowed by pulling the pole members 13, thus adding this excess force to that from the deploying devices 20. Moreover, when the catching net 11 is deployed, the tip of each pole member 13 is always pulled, thereby preventing the caught birds from fleeing from the catching net 11.

Figure 2:
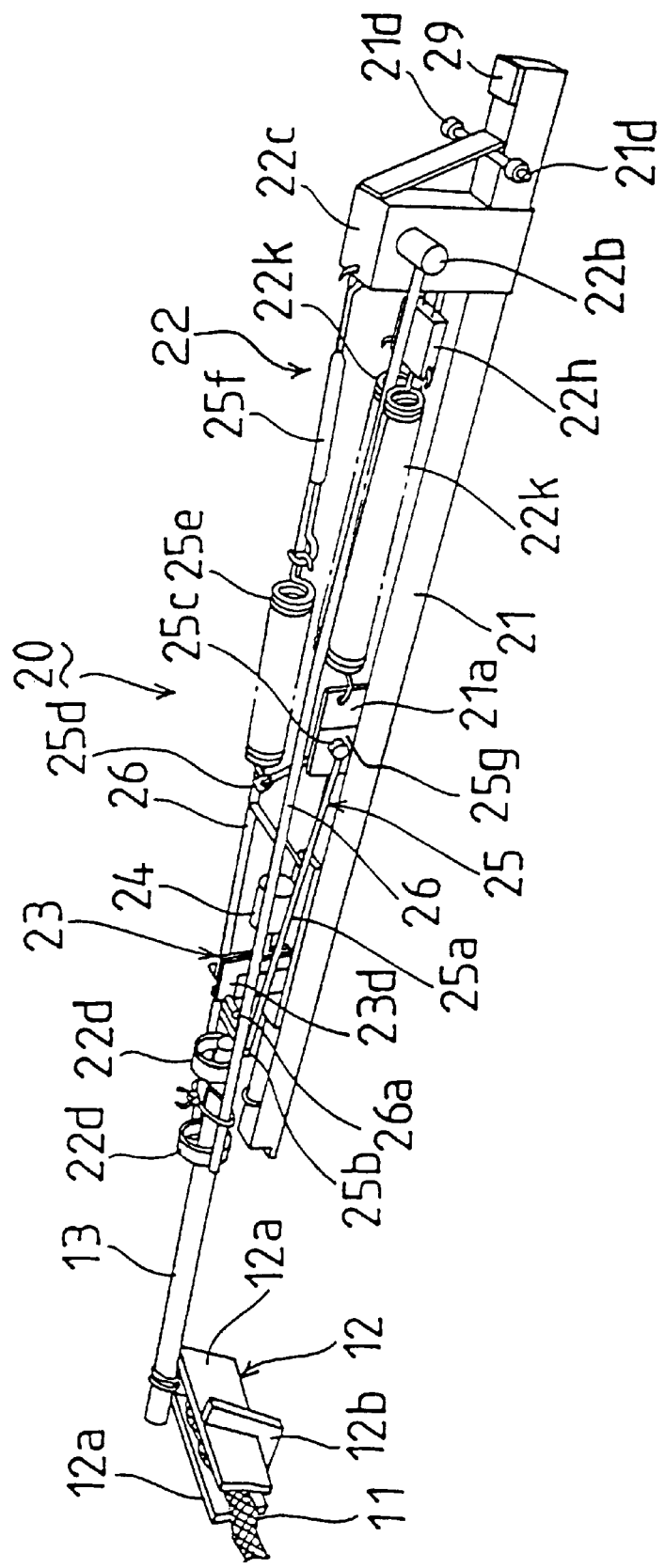
FIG. 2 is a perspective view illustrating a deploying device employed in the bird catching apparatus according to the example of the present invention.
Figure 3:
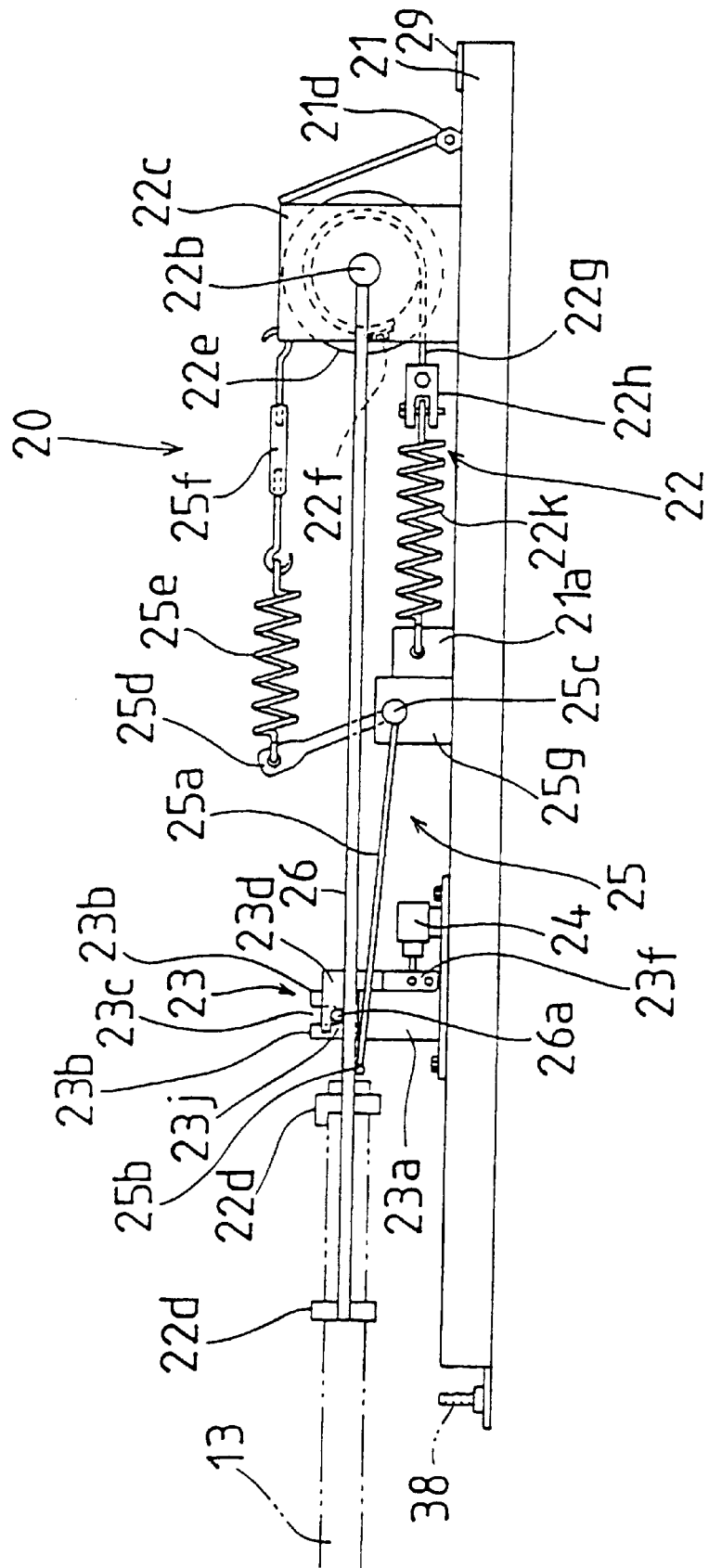
FIG. 3 is a side view illustrating the deploying device of FIG. 2.

FIG. 2 is a perspective view illustrating one deploying device 20 employed for deploying the catching net 11, and FIG. 3 is a side view thereof Each deploying device 20, as shown in FIG. 1, is fixed inside a storage box 30 buried underground. The net cover 12 holding the catching net 11 includes a pair of longitudinal sides of lumber 12a with a width of about 5 cm. The longitudinal lumber sides 12a, whose width direction is vertical, are opposed to each other in a slightly inclined state so that the lower portions may be closer to each other. The longitudinal lumber sides 12a are integrated by a number of brackets 12b spaced appropriately in a longitudinal direction. The catching net 11 has each end of one side edge fixed to brace piles, and is held between the longitudinal lumber sides 12a in a linearly folded state. Each end of the other side edge is fixed to the tip of a pole member 13 by ropes or the like, and the base ends of the pole members 13 are respectively fixed to the tips of a pair of deploying arms 26 arranged at each deploying device 20.

As shown in FIGS. 2 and 3, the deploying device 20 includes a long and narrow base 21 arranged horizontally, and a pair of deploying arms 26 arranged along the base 21 so as to rotate one pole member 13 along a vertical surface, extending over more than 180°. The base 21 is positioned along the crossing line from each end of the net cover 12, with the end (a front end) adjacent to the net cover 12 positioned at the tip of each deploying arm 26, and with the end (a back end) far from the net cover 12 positioned at the base end of each deploying arm 26. Moreover, the back end of the base 21 is provided with a deploying unit 22 urging the tip of each deploying arm 26 upward.

The deploying unit 22 includes a hollow rectangular parallelepiped pedestal 22c that protrudes upward above the back end of the base 21. The pedestal 22c is crosswise provided with a supporting axle 22b extending horizontally along a width direction of the base. Each end of the supporting axle 22b protrudes from each side surface of the pedestal 22c laterally. The rotation of supporting axle 22b is supported by the pedestal 22c. Each end of the supporting axle 22b that protrudes from the pedestal 22c is integrally fixed to each base end of a pair of deploying arms 26. Each deploying arm 26 extends forward in parallel with the base 21. Between the tips of the deploying arms 26, a pair of supporting rings 22d are arranged with an appropriate space in a longitudinal direction of the deploying arms 26. The pole member 13 is inserted in each supporting ring 22d, and is arranged at one end of one side edge of the catching net 11 and is fixed by a rope or the like.

The pedestal 22c supports the rotation of the supporting axle 22b, whose center portion has a pulley 22e. The pulley 22e, positioned inside the pedestal 22c, rotates together with the supporting axle 22b. The pulley 22e is provided with a fixing bolt 22f that extends forward in the extending direction of each deploying arm 26. The fixing bolt 22f checks the center portion of a wire rope 22g. The wire rope 22g is wound around the upper portion of the pulley 22e, and each end is extended forward along the base 21. Each end of the wire rope 22g is arranged at a connector 22h, and each connector 22h checks the end of a pair of extension springs 22k. The extension springs 22k are positioned along the base 21 in parallel with each other. The other end of each extension spring 22k is checked by a pair of checking pieces 21a arranged in the middle of the base 21.

In such a deploying unit 22, a wire rope 22g pulled by a pair of the extension springs 22k urges the pulley 22e, and the deploying arm 26 fixed in the supporting axle 22b is urged together with the pulley 22e so as to rotate the tip upward.

Figure 4:
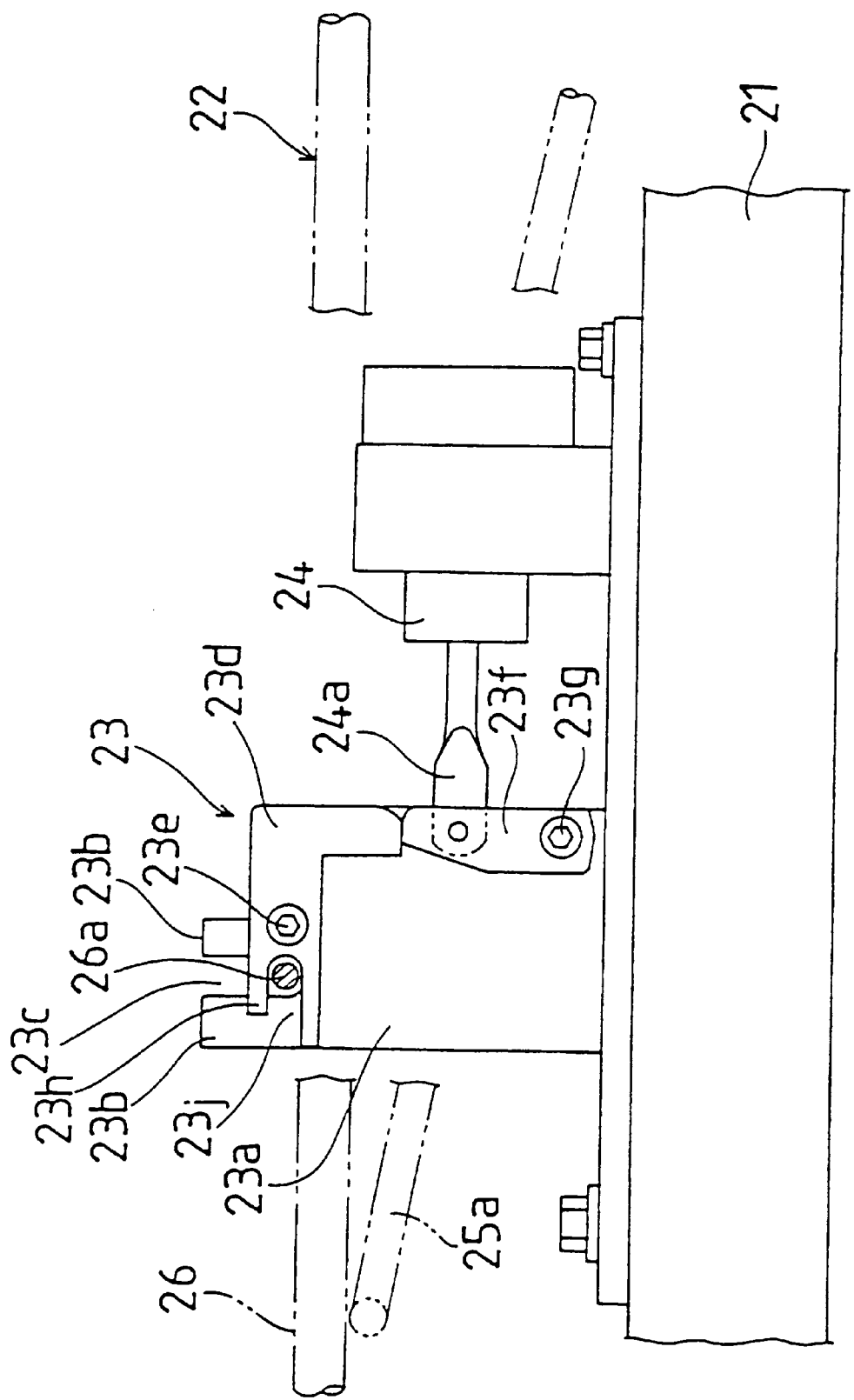
FIG. 4 is an enlarged side view illustrating a locking unit of the deploying device.

At a position near the front end and in the middle of the base 21, a locking unit 23 for locking close to the base 21 a pair of the deploying arms 26 urged upward is provided. FIG. 4 is an enlarged side view of the locking unit 23. The locking unit 23, as shown in FIG. 4, includes an engaging body 23a in a flat plate state, protruding from the central portion (relative to the width) of the base 21. At the upper portion of the engaging body 23a, a pair of protruding pieces 23b protrude upward, with an engaging groove 23c extending vertically arranged between the protruding pieces 23b. In the middle of the pair of the deploying arms 26, opposed to the engaging groove 23c, a checking axle 26a is arranged crosswise between both of the deploying arms 26, such that the engaging axle 26a can be held by the inside of the engaging groove 23c.

At the upper portion of engaging body 23a, a stopper 23d is provided along the engaging body 23a, for checking the checking axle 26a held inside of the engaging groove 23c and preventing the checking axle 26a from leaving the engaging groove 23c. The stopper 23d includes a body extending horizontally along the upper portion of the engaging body 23a and a vertical portion extending vertically from the back of the body, with almost the central portion of the body arranged at the engaging body 23a to rotate around a screw 23e. The tip of the body of the stopper 23d is horizontally provided with a guide groove 23j, engaged with the engaging axle 26a held by the engaging groove 23c. The upper portion of the guide groove 23j is a checking piece 23h for checking the checking axle 26.

On the lower side of the vertical portion of the stopper 23d, a trigger member 23f extends in a vertical direction along the engaging body 23a. The upper end surface of the trigger member 23f touches the lower end surface of the stopper 23d, wherein the checking axle 26a is held inside of the guide groove 23j of the stopper 23d by the checking piece 23h. The lower end of the trigger member 23f is arranged to rotate around a screw 23g at the engaging body 23a. When the trigger member 23f is released from a state wherein the upper end surface touches the lower end surface of the stopper 23d, the upper end rotates, whereby the stopper 23d rotates around the screw 23e to make the guide groove 23j rotate upward.

At the back of the trigger member 23f, a solenoid 24 is provided as a releasing unit for releasing a locked state of a deploying arm 26 caused by the locking unit 23. A plunger 24a of the solenoid 24 horizontally extends forward, with a tip connected to the upper end of the trigger member 23f. When the solenoid 24 is not energized, the trigger member 23f is kept vertical, thereby keeping the trigger member 23f touching the stopper 23d. As a result, the stopper 23d does not rotate. On the other hand, when the solenoid 24 is energized, the plunger 24a is pulled backward, thereby releasing the touch between the stopper 23d and trigger member 23f. As a result, the checking axle 26a held by the guide groove 23j is rotated upward by the deploying arms 26 wherein each tip is urged upward by the pulling force of a pair of the extension springs 22k. Therefore, the checking axle 26a causes the stopper 23d to rotate, and moves upward along the guide groove 23j and the engaging groove 23c of the engaging body 23a, thereby leaving the guide groove 23j and the engaging groove 23c. As a result, the pulling force of a pair of the extension springs 22k causes the pair of deploying arms 26 to rotate vertically, extending more than 180°.

Further backward in the pedestal 22c arranged at the back end of the base 21, a pair of regulation bolts 21d is arranged for regulating the rotation of the deploying arms 26 urged by the deploying unit 22 by protruding to the right and left sides of the base 21.

Between the base 21 and the deploying unit 22, an auxiliary urging unit 25 is arranged for urging further upward the tip of the deploying arm 26. The auxiliary urging unit 25, as shown in FIGS. 2 and 3, includes a pair of auxiliary arms 25a. The base end of each auxiliary arm 25a is positioned at the outside of each frame piece 25g arranged at the front side of a pair of the checking pieces 21a arranged at the middle of the base 21. Each frame piece 25g is crosswise arranged at a horizontal rotating axle 25c which extends along the width direction of the base 21, so as to be rotatable, with the ends of the rotating axle 25c respectively protruding to the outside of each frame piece 25g. The base end of each auxiliary arm 25a is integrally arranged at each end of the rotating axle 25c.

Each auxiliary arm 25a extends to the tip of a deploying arm 26 almost in parallel, and the length of them are equal to each other. The tip of each auxiliary arm 25a is positioned in the vicinity of the supporting ring 22d of the base end side of the deploying arms 26, and between the tips of both auxiliary arms 25a a pressing axle 25b is crosswise arranged. The pressing axle 25b can touch each deploying arm 26. The base end of a lever member 25d is integrally arranged at the center portion of the rotating axle 25c fixed in the base end of each auxiliary arm 25a. The lever member 25d extends upward and forward, and the tip checks one end of the extension spring 25e. The extension spring 25e is positioned in parallel with the upper side of a pair of the extension springs 22k, with the other end checked by the upper surface of the pedestal member 22c through a turn-buckle 25f.

Each auxiliary arm 25a is pulled by the pulling force of the extension spring 25e, allowing the tips to rotate upward. When each deploying arm 26 is urged by the deploying unit 22 while locked by the locking unit 23, it urges the vicinity of the tip of each deploying arm 26 upward. Then, when the locking state of the deploying arms 26 locked by the locking unit 23 is released, it urges strongly in the same direction the deploying arms 26 rotating upward by the urging force of the deploying unit 22.

Figure 5:
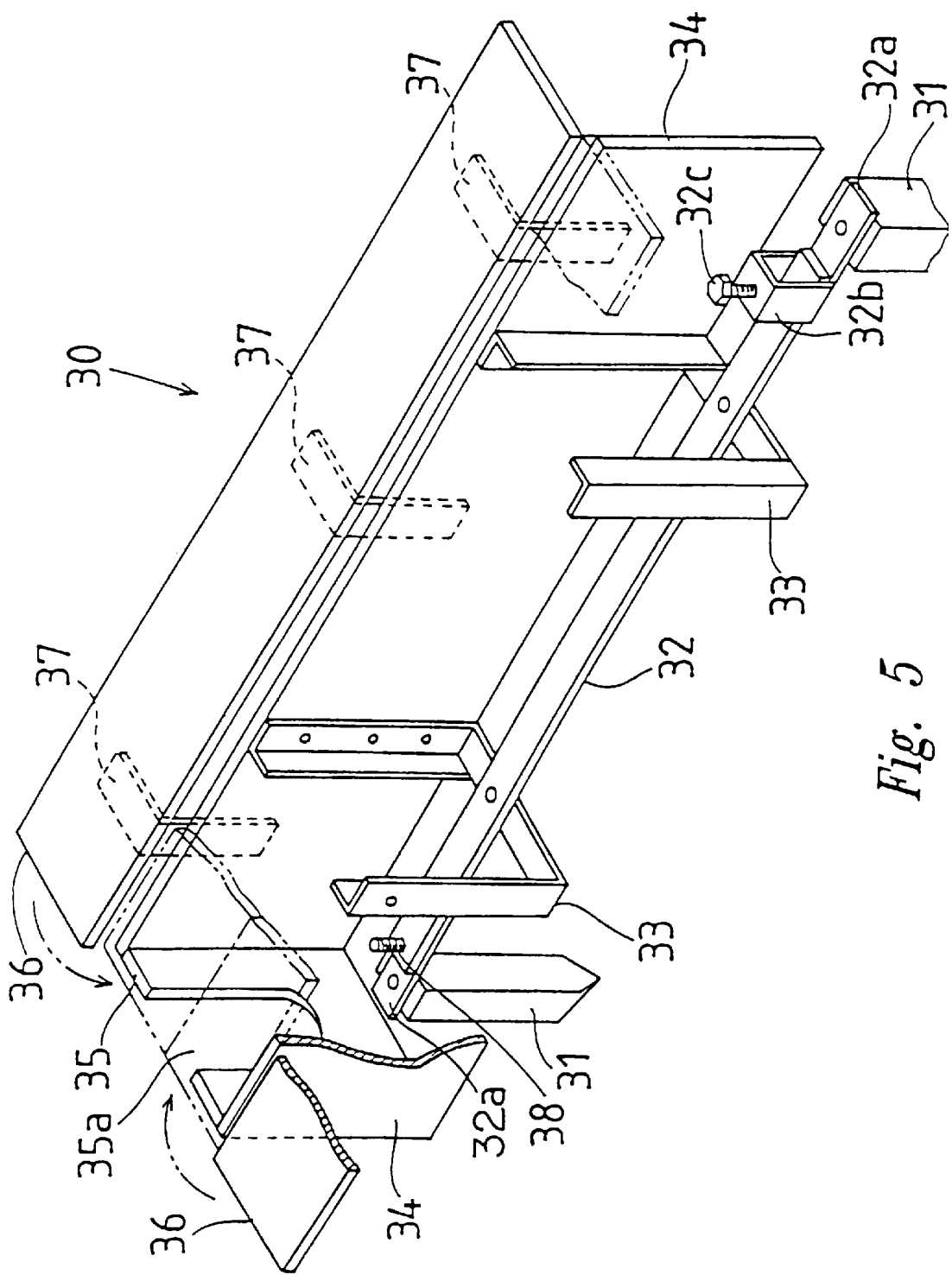
FIG. 5 is a partial-omitted perspective view illustrating a storage box for storing the deploying device.

FIG. 5 is a perspective view illustrating a storage box 30 for storing a deploying device 20. The storage box 30 includes a pair of foundation piles 31 struck into the ground, and a supporting base 32 having a long plate shape, arranged crosswise on both foundation piles 31. The lower surface of each end of the supporting base 32 is provided with a fixing plate 32a extending along the longitudinal direction, with each fixing plate 32a arranged on the upper surface of the foundation piles 31. At a position near each end of the supporting base, U-shaped frame members 33 are respectively arranged. Each frame member 33 is vertical and integrally fixed in the supporting base 32, wherein the lower center portion of the supporting base 32 is mounted on the supporting base 32.

Each frame member 33 is vertically supported by a pair of side plates 34 opposed to each other. One end surface of the side plates 34 is covered with an end plate 35. The upper portion of the end plate 35 includes a U-shaped holding groove 35a, wherein the pole member 13 connected to a deploying device 20 stored inside extends outward via the holding groove 35a. At the upper portion of each side plate 34, a pair of lid plates 36 are arranged to rotate by a number of hinges 37. Each lid plate 36 closes the upper surface of the side plates 34, and the deploying arms 26 of the deploying device 20 rotate upward, thereby causing them to rotate in each side direction and opening the upper surface of each side plate 34.

One end of the supporting base 32 is provided with a positioner 32b for inserting the end of the base 21 in the deploying device 20 and fixing its position. The positioner 32b is downward U-shaped, with an upper surface screwed by a bolt 32 c. The base 21 of the deploying device 20 is inserted inside the positioner 32b, and is fixed by the bolt 32c. The upper surface of the end of the base 21 inserted inside of the positioner 32b is provided with a touching plate 29 which the edge of the bolt 32c touches (see FIG. 3).

Moreover, in the vicinity of the other end of the supporting base 32, a bolt 38 for screwing the base 21 of the deploying device 20 is arranged facing upward. The bolt 38 pierces a piercing hole arranged at the base 21 of the deploying device 20, and a nut is connected by a screw, thereby fixing the base 21.

The deploying device 20 is built as follows. First, in order to fix the wire rope 22g in the pulley 22e, the regulation bolts 21d are removed to make a pair of deploying arms 26 rotate backward around the supporting axle 22b, extending for more than 300°. Under such a condition, the wire rope 22g is wound by the pulley 22e and the other end of the wire rope 22g is fixed in the surface of the pulley 22e. After that, each deploying arm 26 is rotated forward against the pulling force of the extension springs 22k, and is thereby locked by the locking unit 23.

As mentioned above, each deploying device 20 is built in advance, and places where birds such as ducks gather are selected to shallowly bury the net cover 12 in the surface of the earth. Then, inside the net cover 12, each end of one side edge holds the catching net 11 fixed to the brace piles or the like in a linearly folded state. Moreover, each end of the other side edge of the catching net 11 is connected to a tip of a pole member 13.

Under such a condition, grooves are formed on the surface of the earth such that each end of the net cover 12 is appropriately spaced to fall at right angles with the net cover 12. Then, the storage boxes 30 are buried in each groove. In the storage box 30, a pair of foundation piles 31 are respectively struck at the predetermined position, thereby fixing the supporting base 32 to each foundation pile 31. Then, each lid plate 36 is opened, so that the inside of each storage box 30 can hold the deploying device 20. The base 21 of the deploying device 20 is mounted on the supporting base 32 of the storage box 30, held inside the positioner 32b with the bolt 32c fixing the position, and fixed to the supporting base 32 by the bolt 38.

Each deploying device 20 has a state wherein a pair of the deploying arms 26 of the deploying unit 22 have been rotated forward against the urging force of the deploying unit 22, and wherein the checking axle 26a is held inside the engaging groove 23c of the engaging body 23a and the guide groove 23j of the stopper 23d in the locking unit 23, checked by the checking piece 23h and the plunger 24a when the solenoid 24 is forward. Thus, the stopper 23d is kept in a state wherein it does not rotate due to the trigger member 23f.

With each deploying device 20 stored inside the storage boxes 30, the pole members 13 arranged at the catching net 11 are run through the holding groove 35a in the end plate 35 of each storage box 30 to be inserted inside a pair of supporting rings 22d of the deploying device 20. Each pole member 13 is fixed to the pair of deploying arms 26 by ropes or the like. While in such a condition, the lid plate 36 is rotated, thereby closing the upper surface of each side plate 34. Then, the lid plate 36 is thinly covered with sand or the like, and the catching net 11 inside the net cover 12 is thinly covered with sand or the like. Moreover, each pole member 13 is thinly covered with sand or the like. Moreover, a cable for energizing the solenoid 24 in each deploying device 20 is also laid on the surface of the earth and thinly covered with sand or the like. The cable includes one switch so as to make it possible to energize together both solenoids 24 in the deploying devices 20. The switch is positioned at a place about 15–20 m from the place where the catching net 11 is positioned. After that, a bait is sprinkled on the surface of the earth between the pair of storage boxes, along the net cover 12.

Operators then wait for birds to gather at the place where the bait is sprinkled, with the switch in the cable for energizing the solenoids 24. Then, when a number of birds gather, the switch is operated, thereby energizing each solenoid 24 in the deploying devices 20 to pull their plungers.

When the plungers 24a are pulled, the trigger members 23f are inclined backward, thereby releasing a checking state that enables the stopper 23d to rotate. As a result, each deploying arm 26 is pulled by a pair of extension springs 22k and rotates upward, and each checking axle 26a rotates upward with the deploying arms 26 and leaves the guide groove 22e of the stopper 22d and the engaging groove 23c of the engaging body 22a. Then, each deploying arm 26 is vertically rotated above the surface of the earth by the pulling force of a pair of the extension springs 22k for more than 180°.

Each deploying arm 26 is further urged strongly upward by the auxiliary arm 25a pulled by the extension spring 25e in the auxiliary urging unit 25, whereby the deploying arms 26 cause the lid plates 36 of the storage boxes 30 to surely rotate, thereby being surely exposed on the surface of the earth. Then, each deploying arm 26 surely rotates along a vertical surface for more than 180°. The tip of each pair of deploying arms 26 is provided with a pair of supporting rings 22d to be connected with a pole member 13 connected to the ends of the catching net 11. The pole members 13 rotate with the deploying arms 26, and each end of one side edge of the catching net 11 is then pulled out of the surface of the earth by the pole members 13, so as to be deployed to cover birds on the earth. As a result, birds gathered on the surface of the earth are covered with the catching net 11 and caught.

Since each deploying arm 26 is pulled by a pair of extension springs 22k and is urged by the auxiliary 25a pulled by the extension spring 25e when the solenoid 24 is energized at the same time, the result is that the deploying arm 26 rotates at high speed and the catching net 11 is deployed on the surface of the earth quickly to enable a number of birds gathered on the ground to be caught. The catching net 11 covering the ground is pressed to the surface of the earth by the deploying arms 26 pulled by the pair of extension springs 22k, and is also pressed to the surface of the earth by the wire rope 14 pulled by the extension spring 15. Thus, there is no possibility that birds covered with the catching net 11 can flee from a clearance between the catching net 11 and the surface of the ground.

Each deploying device 20 for deploying the catching net 11 is stored inside a storage box 30 covered with a lid plate 36, with the result that there is no possibility that it breaks down due to soil, dust, wind and rain. Since each lid plate 36 is thinly covered with sand or the like, the storage box 30 and the deploying device 20 are not exposed on the surface of the earth, thus allowing birds to come near it without being cautious. The pole member 13 is inserted inside a pair of the supporting rings 22d arranged between the tips of a pair of the deploying arms 26 and is fixed by a string or the like, allowing the length of each deploying arm 26 and pole member 13 to be easily adjusted.

Each deploying arm 26 is about 1.5 m in length. With a deploying device 20 including such deploying arms 22, a deploying device 20 is arranged at each end in a longitudinal direction of the catching net 11 of about 15 m in length and about 5 m in width, thereby making it possible to deploy the catching net 11. Accordingly, if the length of the catching net 11 reaches about 30 m, deploying devices 20 are fixed in each end and the center of the longitudinal direction of the catching net 11 (i.e., 3 points), thereby ensuring that the catching net 11 is deployed.

Furthermore, it is also possible to catch birds such as ducks swimming on the water. If a catching net 11 of 5 m in width is deployed, the deploying device 20 is built so that a 3.5 m width portion is positioned on the ground, and a 1.5 m width portion is positioned under water. Thus, birds on the water can be covered with the deployed catching net 11. Though birds such as ducks can dive under the water, the catching net 11 can be pressed on the bottom surface underwater by the deploying arms 26 and the extension springs 22k or the like, with the result that there is no possibility that the birds can flee from a clearance between the catching net 11 and the bottom surface, thereby making it possible to catch them surely.

Thus, a bird catching apparatus according to the present invention, wherein each deploying arm of each deploying device is rotated by a deploying unit so as to deploy a catching net rapidly, enables a number of birds to be surely caught. A deploying arm urged by an auxiliary unit can deploy the catching net more rapidly and surely. The deploying arms are locked by the locking unit, which can be released by the releasing unit, and can rotate surely without missing the moment when the birds gather. The releasing unit is a solenoid which can be operated by remote control, with the result that it is not necessary for operators to be positioned in the vicinity of the catching net to enable birds to be easily caught. Each deploying device can be built everywhere, and stored in the storage box buried underground, whereby the occurrence of troubles or the like is controlled and the raising of birds' caution is also controlled.

What is claimed is:

1. A bird catching apparatus comprising:
    a catching net, folded linearly, having a fixed side edge with two ends fixed in the surface of the earth and having an opposite side edge with two ends;
    a pair of deploying devices each having a respective deploying arm, each deploying arm having a base end connected to the deploying device and a tip away from the deploying device, the tip of each deploying arm respectively connected with each end in the opposite side edge of the catching net, for deploying the catching net from a folded state by rotating the deploying arms around the deploying devices along a vertical plane;

a deploying unit for each deploying device that urges the respective deploying arm so as to make the respective deploying arm rotate in a fixed direction;

an auxiliary urging unit for each deploying device that urges a vicinity of the tip of the respective deploying arm in the same direction as the urging direction urged by the deploying unit;

a locking unit for each deploying device that locks the respective deploying arm in a state urged by the deploying unit; and a releasing unit for each deploying device that releases the respective deploying arm locked by the locking unit.

2. A bird catching apparatus according to claim 1, wherein the deploying unit includes:

a pulley arranged at the base end of the respective deploying arm, for rotating integrally with the respective deploying arm;

a wire rope fixed to and wound around the pulley; and a pair of extension springs for urging the wire rope, whereby the extension springs urging causes movement of the wire rope and integral rotation of the pulley and the respective deploying arm.

3. A bird catching apparatus according to claim 1, wherein the releasing unit is a solenoid to be operated remotely.

4. A bird catching apparatus according to claim 1, wherein each deploying device is fixed in a box buried underground.

* * * * *